(12) United States Patent
Suetake

(10) Patent No.: US 8,275,421 B2
(45) Date of Patent: Sep. 25, 2012

(54) WIRELESS COMMUNICATION DEVICE

(75) Inventor: Hiroyasu Suetake, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 350 days.

(21) Appl. No.: 12/664,583

(22) PCT Filed: Jul. 8, 2008

(86) PCT No.: PCT/JP2008/062315
§ 371 (c)(1),
(2), (4) Date: Dec. 14, 2009

(87) PCT Pub. No.: WO2009/008417
PCT Pub. Date: Jan. 15, 2009

(65) Prior Publication Data
US 2010/0222111 A1     Sep. 2, 2010

(30) Foreign Application Priority Data
Jul. 10, 2007     (JP) ................................. 2007-181329

(51) Int. Cl.
*H04M 1/00*     (2006.01)

(52) U.S. Cl. .................. 455/566; 455/575.7; 455/575.1; 455/575.4; 455/550.1

(58) Field of Classification Search ............... 455/575.7, 455/575.1, 566, 575.3, 575.4, 550.1
See application file for complete search history.

(56) References Cited

U.S. PATENT DOCUMENTS 6,249,688 B1 * 6/2001 Holshouser et al. ....... 455/575.7
7,966,050 B2   6/2011 Okajima et al.
2005/0070279 A1 * 3/2005 Ginzburg et al. ............. 455/434
2005/0170824 A1 * 8/2005 Dowling ....................... 455/418
2006/0063560 A1 * 3/2006 Herle .......................... 455/552.1

(Continued)

FOREIGN PATENT DOCUMENTS

| EP | 1 885 102 A1 | 2/2008 |
| JP | 2005-318406 A | 11/2005 |
| JP | 2006-41899 A | 2/2006 |
| JP | 2006-115419 A | 4/2006 |

(Continued)

OTHER PUBLICATIONS

Japanese Office Action for corresponding Japanese application No. 2009-522648, dated Sep. 27, 2011.

*Primary Examiner* — Kathy Wang-Hurst
(74) *Attorney, Agent, or Firm* — Birch, Stewart, Kolasch & Birch, LLP

(57) ABSTRACT

With respect to a mobile wireless device in which a first housing 101 and a second housing 102 are foldably connected via a hinge 104, and in which a third housing 103 comprising a substantially rectangular display portion 106 is connected to the second housing 102 with a rotation mechanism portion 105 that rotates in a plane that is parallel with respect to a surface of the second housing 102, an antenna 107 is placed at an end portion of the first housing 101 on the side of the hinge, and a passive element 108 is placed at an end portion of the third housing 103. As a user rotates the third housing 103 by 90° to view visual data in horizontally long display, the antenna 107 and the passive element 108 are electro-magnetically coupled with each other, and the antenna characteristics of the antenna 107 improve. Thus, it becomes possible to provide an antenna that is more efficient when viewing visual data with a mobile wireless device, which is capable of receiving terrestrial digital TV and other visual data, on a screen that displays in a horizontally long manner.

22 Claims, 14 Drawing Sheets

U.S. PATENT DOCUMENTS

| | | |
|---|---|---|
| 2006/0125700 A1 | 6/2006 | Kanazawa |
| 2007/0093281 A1* | 4/2007 | Park et al. .................. 455/575.4 |
| 2007/0149214 A1* | 6/2007 | Walsh et al. ............... 455/456.1 |
| 2007/0225052 A1 | 9/2007 | Yamazaki et al. |
| 2009/0270139 A1 | 10/2009 | Okajima et al. |

FOREIGN PATENT DOCUMENTS

| | | |
|---|---|---|
| JP | 2006-166265 A | 6/2006 |
| JP | 2006-332792 A | 12/2006 |
| JP | 2006-332795 A | 12/2006 |
| JP | 2007-166258 A | 6/2007 |

* cited by examiner

FIG. 1
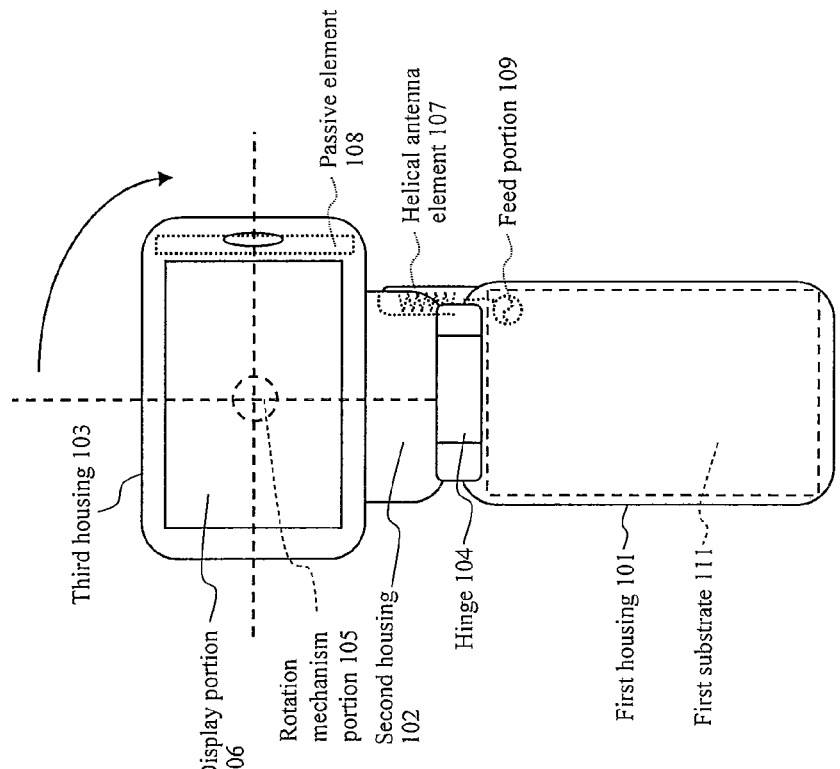
(B)
<Horizontally long display>
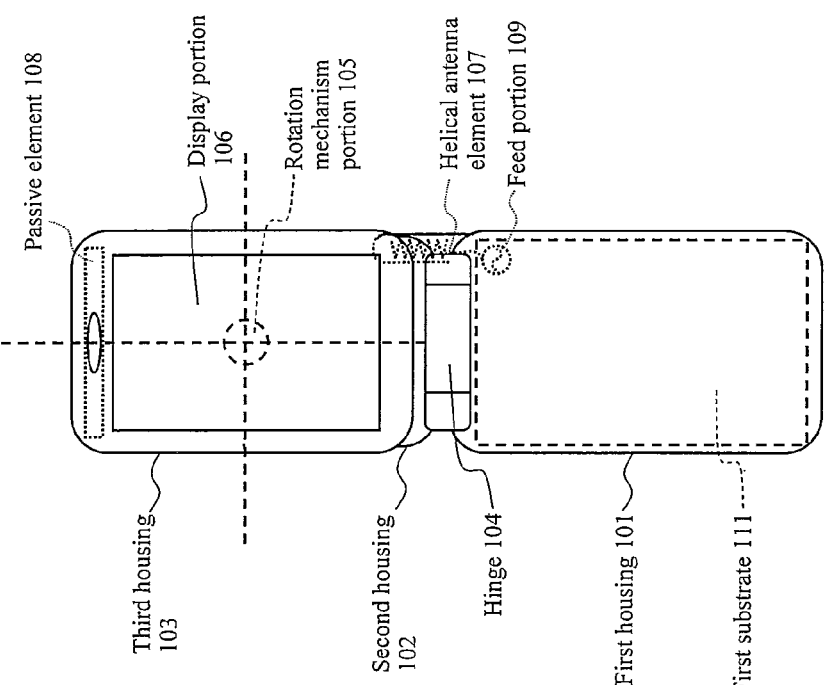
(A)
<Vertically long display>

FIG. 2
(A)
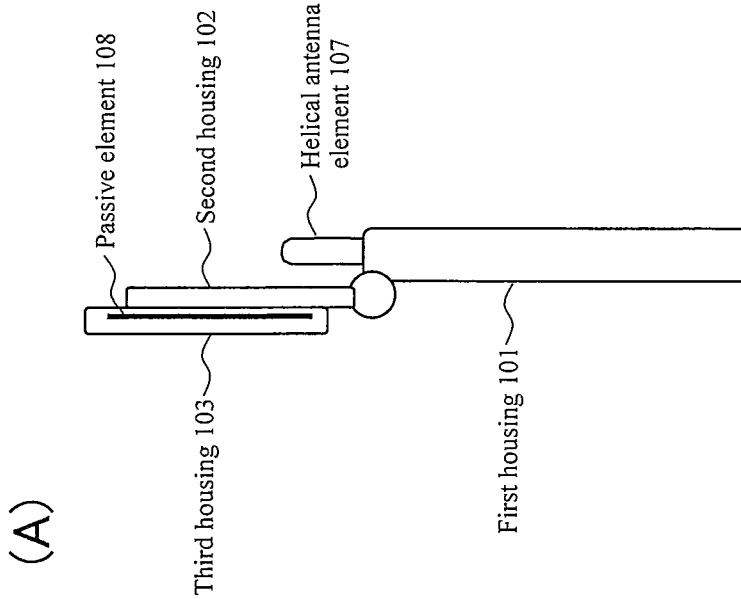
<Visual data viewing 1>
(B)
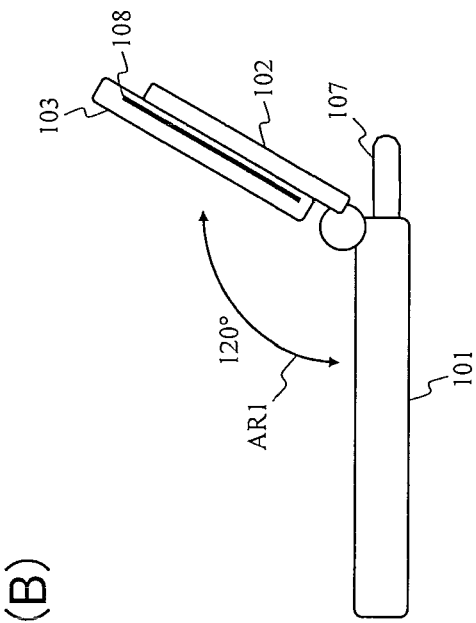
<Visual data viewing 2>

FIG. 6
(A) <Vertically long display>
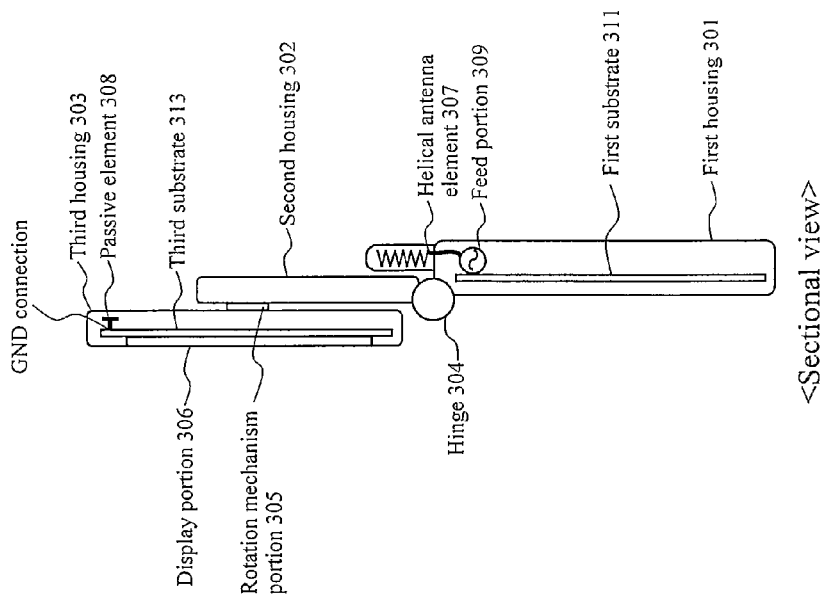
(B)
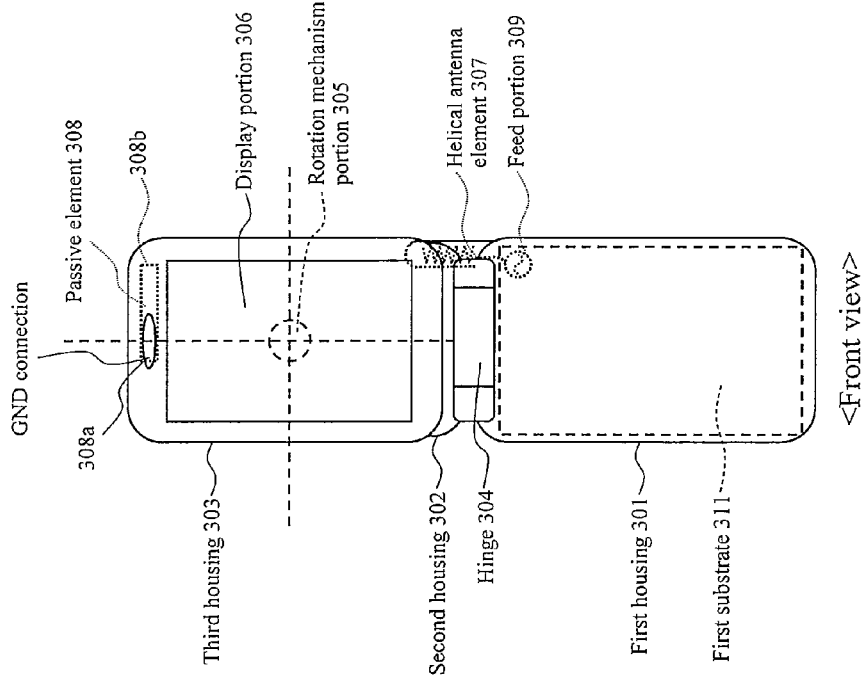
<Sectional view>

FIG. 8
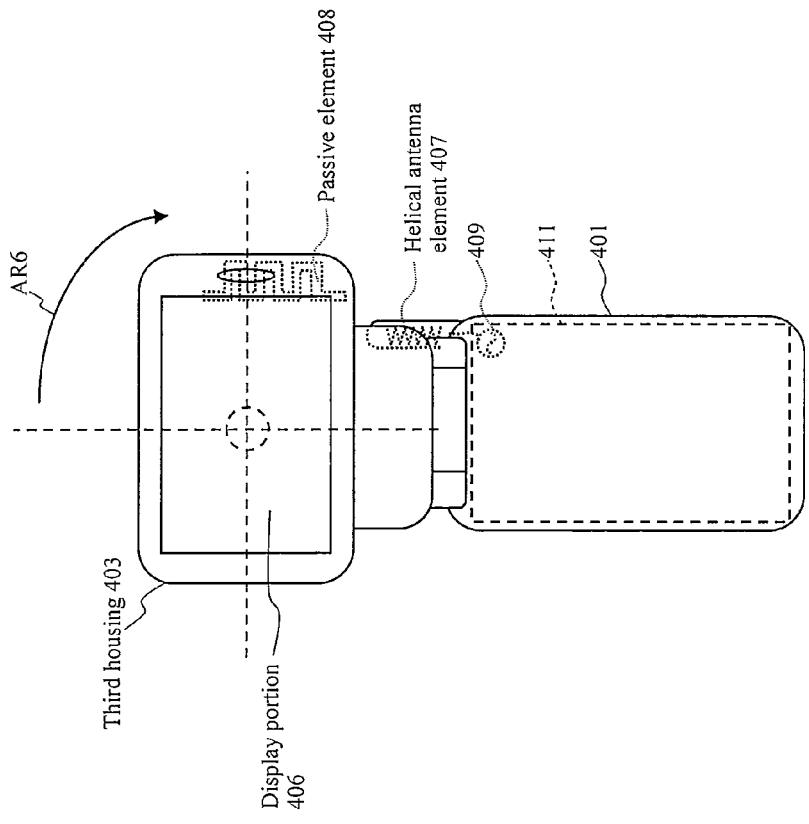
(B) <Horizontally long display>
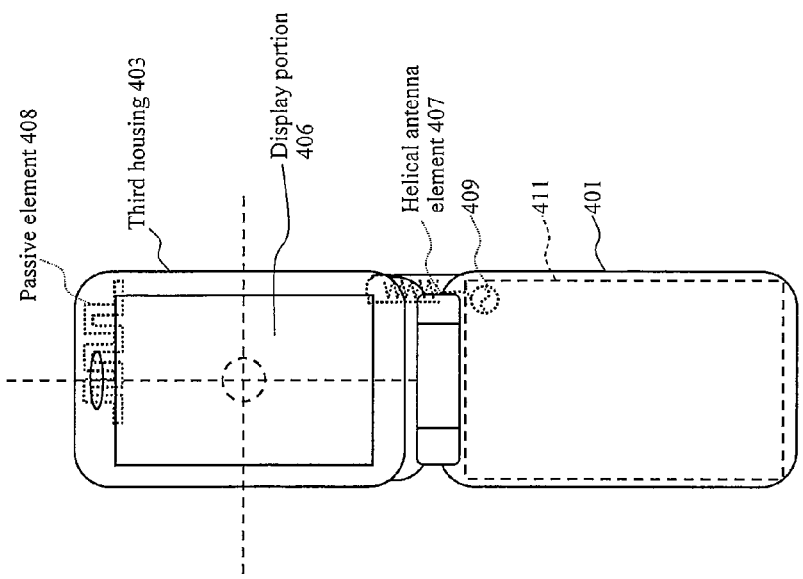
(A) <Vertically long display>

FIG. 9
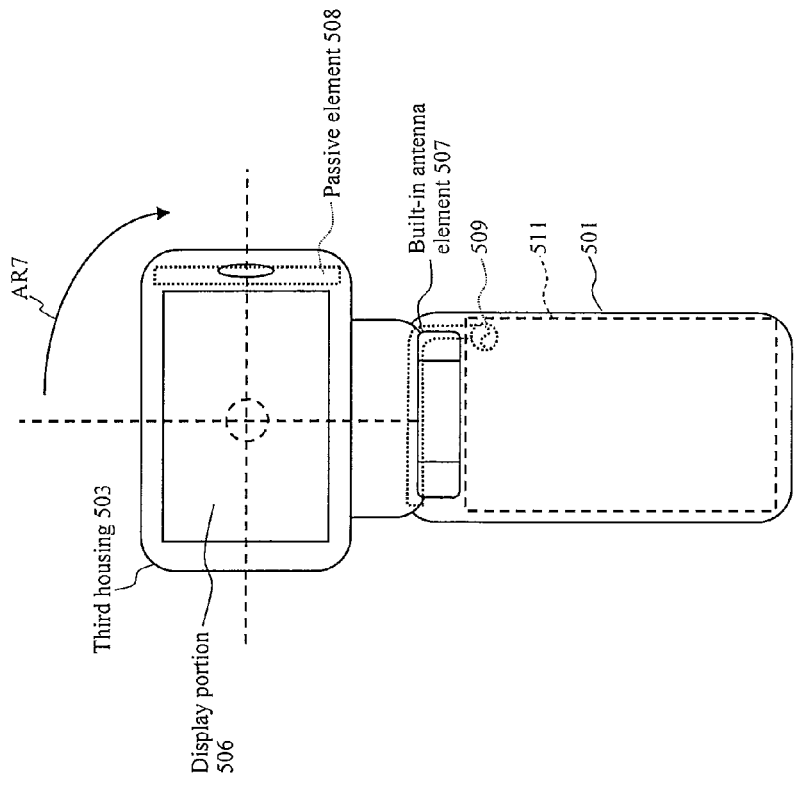
(A) <Vertically long display>
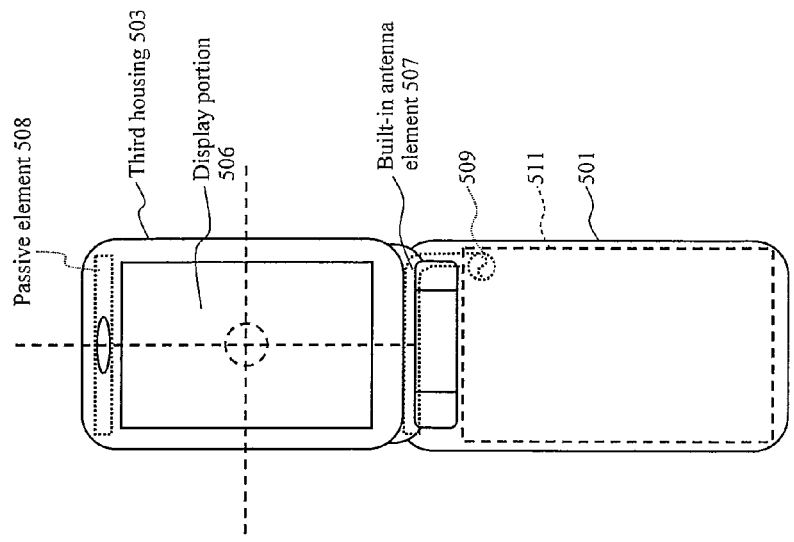
(B) <Horizontally long display>

FIG. 12
(A)
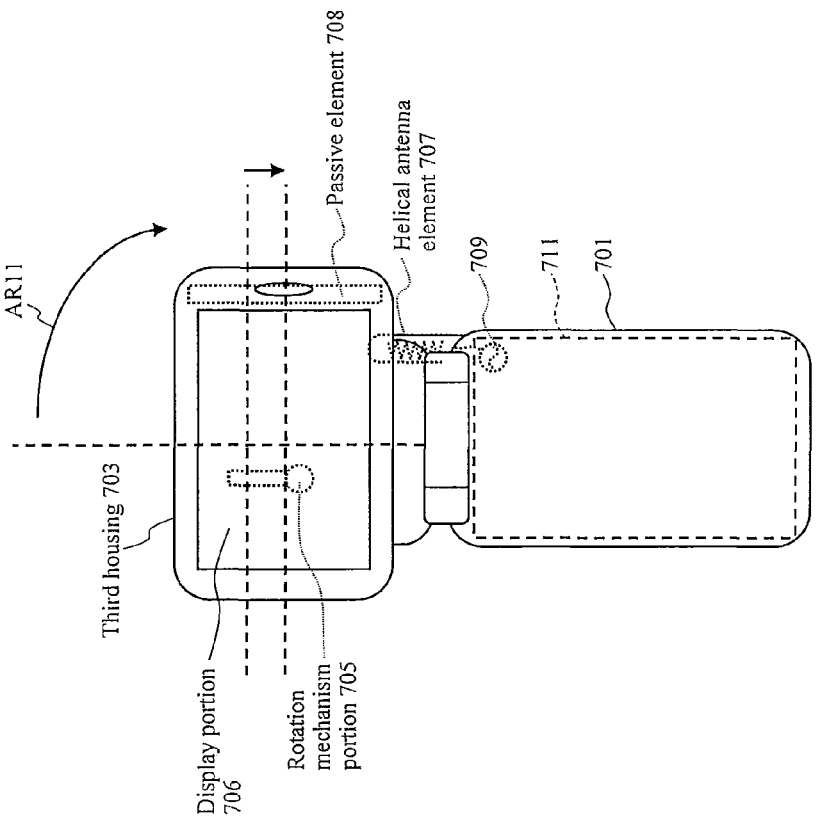
<Vertically long display>
(B)
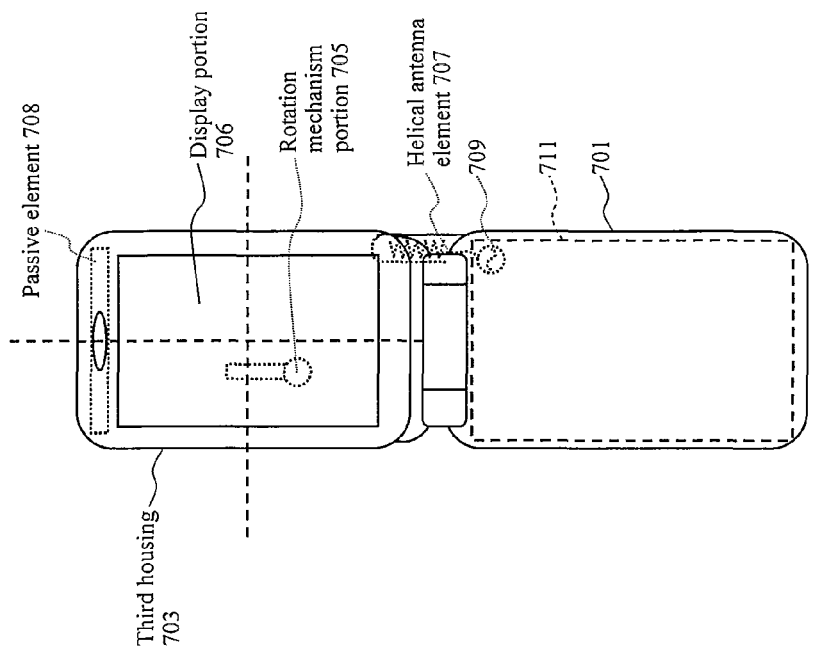
<Horizontally long display>

<Horizontally long display>

<Horizontally long display>

WIRELESS COMMUNICATION DEVICE

TECHNICAL FIELD

The present invention relates to a wireless communication device that performs voice communication, data communication and the like, and more particularly to a wireless communication device whose display portion changes shape to become vertically long or horizontally long.

BACKGROUND ART

Housing configurations for mobile phones are becoming more diverse each year, and there exists a variety of modes of use depending on differences in the housing configuration, and the like. Among them, two kinds of types are currently wide use: the straight type, which is used in the same mode across all of calls, data communication, and standby; and the foldable type, which is used by opening the housing during calls and data communication, and by closing the housing during standby. In addition, recently, the communication speed of mobile phones has become faster, and mobile phones that are capable of receiving such visual data as videos, video phone calls, one-seg broadcasts and the like, are beginning to grow popular. Because the majority of visual data is displayed in horizontally long (wide) manner, we are beginning to see mobile phones with housing configurations that enable making the display screen of the mobile phone display as a horizontally long screen when users are viewing visual data.

FIG. 1 is a diagram showing an example of the housing configuration of a mobile phone that is capable of horizontally long screen display when visual data is viewed, and is a diagram showing a configuration example of a mobile phone comprising a helical antenna. The housing configuration of the mobile phone in FIG. 1 is such that a first housing 101 and a second housing 102 are rotatably connected via a hinge 104, a third housing 103 equipped with a substantially rectangular display portion 106 is connected to the second housing 102 with a rotation mechanism portion 105 that rotates in a plane that is parallel with respect to a housing surface thereof, and the housing configuration comprises two display modes, namely, mode (A) in which the display portion 106 displays in a vertically long manner through the rotation of the rotation mechanism portion 105, and mode (B) in which it displays in a horizontally long manner. Thus, when displaying such visual data as videos, television (hereinafter abbreviated as TV) images and the like, it is possible to change readily to horizontally long display by rotating the third housing including the display portion 106 by 90°. FIG. 1 is a diagram showing the condition of vertically long display (A) and the condition of horizontally long display (B) viewed from a direction from which the display screen of the display portion 106 is visible. Of the housing configurations for mobile phones mentioned above, with respect to mobile phones of the foldable type or mobile phones with the housing configuration shown in FIG. 1, the housing is opened/closed and rotated in accordance with the user's mode of use. With respect to the foldable type in particular, because the reception characteristics of the antenna during calls and data communication (the mode in which the housing is opened) are different from those during standby (the mode in which the housing is closed), solutions for improving antenna characteristics in accordance with the mode of use have hitherto been proposed In Patent Document 1 mentioned below, there is disclosed a technique for improving antenna characteristics during calls and data communication (the mode in which the housing is opened) for mobile phones of the foldable type. In addition, in Patent Document 1, there is also disclosed an antenna configuration for improving antenna characteristics during standby (the mode in which the housing is closed) for mobile phones of the foldable type.

[Patent Document 1] Japanese Patent Publication (Kokai) No. 2006-41899 A

DISCLOSURE OF THE INVENTION

Problem to be Solved by the Invention

With mobile phones that are capable of receiving such visual data as videos, TV and the like, because the data volume of such visual data is extremely large as compared to the data volume of voice data communication, better communication quality is required. In addition, because mobile phones of late are so designed as to make it easier to view visual data by making the display screen size larger, the data volume of visual data further increases, necessitating even better communication quality. Thus, with respect to the mobile phone of the housing configuration shown in FIG. 1, high communication quality is desired in the mode of use in which the third housing including the display portion 106 is rotated by 90° and changed to horizontally long display (i.e. during visual data viewing), and a design for a more efficient antenna becomes necessary.

Here, a problem relating to an antenna of a mobile phone of the housing configuration shown in FIG. 1 is considered. As indicated by arrow AR12, it can be made vertically long.

With the mobile phone of the housing configuration shown in FIG. 1, it is necessary to perform reception with an antenna element provided in the first housing, and to wire a visual data signal, which is demodulated at a module, to the display portion 106 provided on the third housing. Therefore, as shown in FIG. 13, the configuration is such that a first substrate 811 and a third substrate 813 are connected using a connective conductor 814, such as a connective flexible conductor, a thin wire coaxial cable, and the like. Here, the distribution of the currents flowing across the third substrate 813 flows from the center of the third substrate 813 (broken line) to the left and right (see the arrows with the dotted stems) as shown in FIG. 13. Since these currents cancel one another out, the third substrate 813 within a third housing 803 is not excited, and antenna characteristics deteriorate.

In contrast thereto, if the connection position between the third substrate 813 and the connective conductor 814 is changed as shown in FIG. 14, the distribution of the currents flowing across the third substrate would now flow from the left end to the right end of the third substrate 813 in the diagram as shown in FIG. 14 (see the arrows with the dotted stems), the third substrate 813 would be excited, and antenna characteristics would improve. However, if the capacitance of the portion where the connective conductor 814 and the third substrate 813 overlap is large, because the current distribution would then be similar to that of FIG. 13, it would be necessary to separate the connective conductor 814 and the third substrate 813 spatially to some extent, thereby giving rise to a problem which is that the thickness of the third housing 803 would become greater than what is conventional.

In addition, with respect to FIG. 14, if the second housing is made metallic for such purposes as making the second housing thinner, the connective conductor 814 and the second housing, the first substrate 811 and the second housing, and the second housing and the third substrate 813 are mutually capacitively coupled. Thus, there arises a problem in that the connection conditions of the connective conductor for exciting the third substrate 813 become extremely complicated.

The present invention is made in view of such problems, and seeks to provide an antenna that is of a simple antenna configuration and efficient even in cases where high communication quality is desired.

Means for Solving the Problem

In order to solve the problems above, the present invention is a wireless communication device in which a first housing and a second housing are connected with a hinge so as to be foldable and a third housing having a substantially rectangular display portion is connected to the second housing with a rotation mechanism portion that rotates in a plane that is parallel with respect to a housing surface, and which is capable of assuming, by means of the rotation mechanism portion, a first display mode in which the display portion is horizontally long and a second display mode in which the display portion is vertically long, wherein the wireless communication device comprises an antenna element provided at the first housing near the hinge, and a passive element placed at the third housing at a position where it becomes electro-magnetically coupled with the antenna element in the first display mode.

According to the wireless communication device mentioned above, because the antenna element and the passive element become electro-magnetically coupled with each other, and the passive element excited, by simply rotating the display portion by 90° so that the display portion displays in a horizontally long manner, good antenna characteristics are obtained.

According to an aspect of the present invention, there is provided a wireless communication device that is capable of assuming a first housing, a second housing that is foldably connected to the first housing via a hinge portion, a third housing having a substantially rectangular display portion, a rotation mechanism portion that rotatably connects the third housing and the second housing in a plane that is parallel to a display surface of the display portion, a first display mode in which, through a rotation by the rotation mechanism portion, the display portion displays in a horizontally long manner when the first housing is held, and a second display mode in which the display portion displays in a vertically long manner, the wireless communication device characterized by comprising an antenna element provided at the first housing near the hinge, and a passive element placed at the third housing at a position where electro-magnetic coupling with the antenna element becomes stronger in, of the display modes, at least the first display mode. Thus, in accordance with the display mode, the reception characteristics of the antenna element improve.

The passive element may be placed at an end portion of the third housing in the shorter direction. It may also be placed at an end portion of the third housing in the longer direction.

The passive element is preferably an element with both ends open, and an element that is so adjusted that the electrical length of the passive element is approximately one half of the wavelength with respect to a frequency used by the antenna element. In addition, the passive element is preferably an element in which one of its end portions is conductively connected with a ground portion of the third housing and in which the other end portion of the passive element is open, and one that is so adjusted that the electrical length of the passive element is approximately a quarter of the wavelength with respect to the frequency used by the antenna element. The passive element may also be a meander element. The antenna element may also be an antenna element that is built into and placed in the first housing near the hinge.

The antenna element may also be a helical antenna element externally placed on the first housing near the hinge, and the helical antenna element may be placed at a position where the electro-magnetic coupling with the passive element placed at the third housing becomes stronger in at least the first display mode in which the display portion displays in a horizontally long manner. The antenna element may also be a whip antenna that allows for extension and storage of the antenna.

The rotation mechanism portion may comprise a rotation axis varying mechanism that varies the rotation axis of the second housing. The rotation axis varying mechanism may vary the rotation axis in such a manner that, when changing from the second display mode to the first display mode, the electro-magnetic coupling between the passive element and the antenna element becomes stronger. For example, the rotation axis varying mechanism may be of a configuration in which the rotation axis moves in the up/down direction as a result of the pivot point of the rotation axis moving along a rail extending in the vertical direction in accordance with the rotation.

In the first display mode, visual data may be received. On the other hand, in the second display mode, communication and calls are enabled.

It would be convenient if the switch between the first display mode and the second display mode were coordinated with the switch between the above-mentioned reception of the visual data and the above-mentioned communication and calls.

Effect of the Invention

According to the present invention, with respect to a wireless communication device in which a first housing and a second housing are foldably connected via a hinge and in which a third housing having a substantially rectangular display portion is connected to the second housing with a rotation mechanism portion that rotates in a plane that is parallel with respect to a surface of the second housing, because a passive element is placed at the third housing with respect to an antenna that is placed at the first housing near the hinge, it is possible to achieve good antenna characteristics by simply rotating the display portion such that it displays in a horizontally long manner.

BRIEF DESCRIPTION OF THE DRAWINGS

FIG. 1 is a diagram showing a configuration example of a mobile wireless device according to the first embodiment of the present invention.

FIG. 2 is a diagram showing a configuration example of a mobile wireless device according to the first embodiment of the present invention.

FIG. 6 is a diagram showing a configuration example of a mobile wireless device according to the third embodiment of the present invention.

FIG. 8 is a diagram showing a configuration example of a mobile wireless device according to the fourth embodiment of the present invention.

FIG. 9 is a diagram showing a configuration example of a mobile wireless device according to the fifth embodiment of the present invention.

FIG. 12 is a diagram showing a configuration example of a mobile wireless device according to the seventh embodiment of the present invention.

Figure 3:
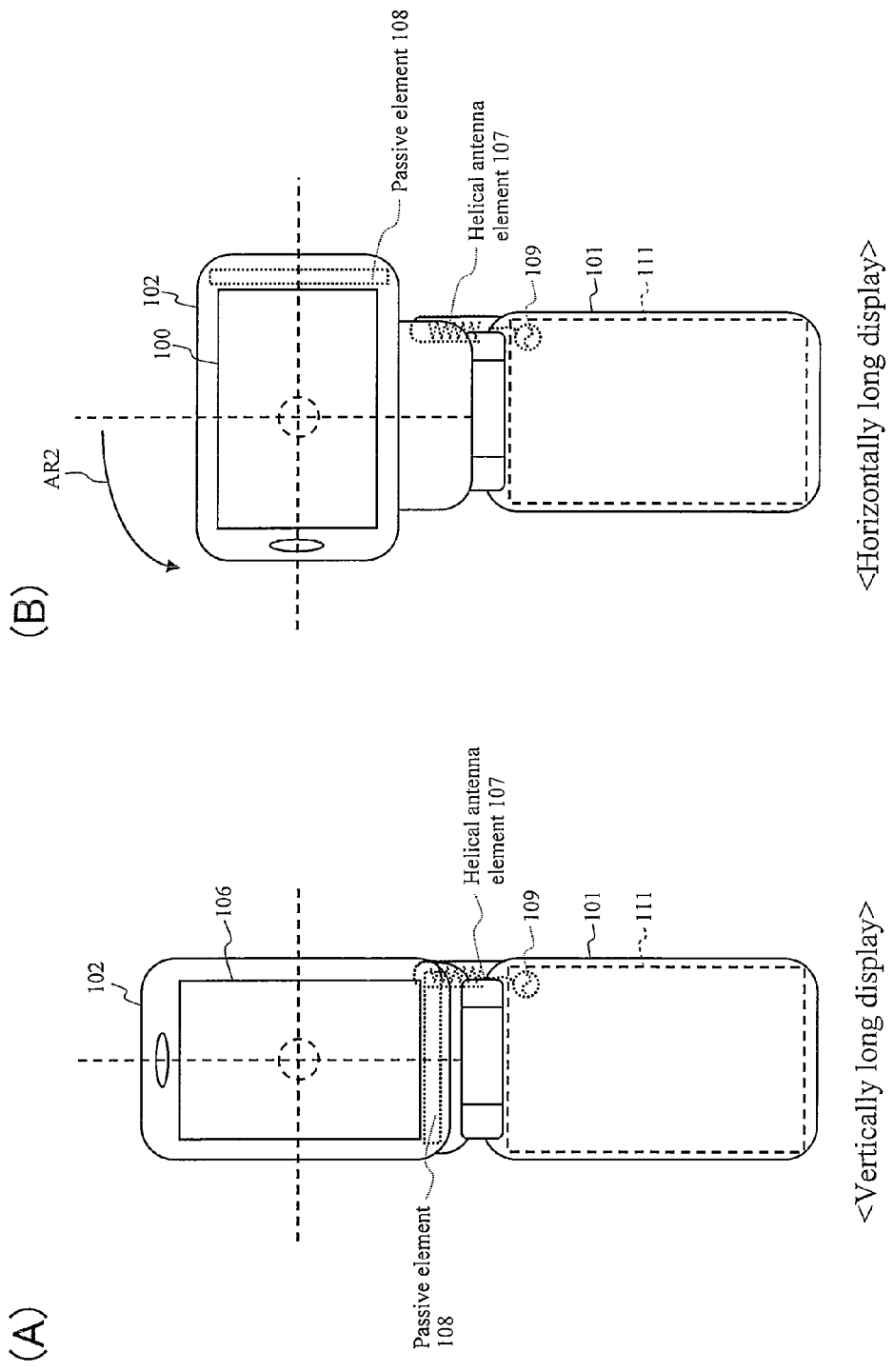
FIG. 3 is a diagram showing a configuration example of a mobile wireless device according to the first embodiment of the present invention.

DESCRIPTION OF THE REFERENCE NUMBERS 101, 201, 301, 701, 801 First housing
102, 202, 302, 702 Second housing
103, 203, 303, 403, 503, 603, 703, 803 Third housing
104, 204, 304 Hinge
105, 205, 305, 705 Rotation mechanism portion
106, 206, 306, 406, 506, 606, 706 Display portion
107, 207, 307, 407, 707, 807 Helical antenna element
507 Built-in antenna element
607 Whip antenna
108, 208, 308, 408, 508, 608, 708 Passive element
109, 209, 309, 409, 809 Feed portion
111, 211, 311, 811 First substrate
313, 813 Third substrate
814 Connective conductor

BEST MODE FOR CARRYING OUT THE INVENTION

Mobile phones according to various embodiments of the present invention are described in detail below with reference to the drawings.

First Embodiment

FIG. 1 to FIG. 3 are diagrams showing external configuration examples of mobile phones according to the first embodiment of the present invention. Here, the antenna element for receiving such visual data as videos, television (TV) images and the like used in mobile phones according to the first embodiment is a helical antenna element 107 placed at the first housing 101 near the hinge. In addition, a passive element 108 is an element with both ends open, and the electrical length thereof is approximately one half of the wavelength with respect to a frequency used by the helical antenna element 107.

In FIG. 1, the first housing 101 and the second housing 102 are foldably connected via the hinge 104, and the helical antenna element 107 is fed power from a feed portion 109 placed at the upper end portion of a first substrate 111 within the first housing 101.

The third housing 103 is equipped with the display portion 106 for displaying videos, visual data of TV, and the like. In addition, the second housing 102 and the third housing 103 form an upper housing, and a rotation motion of at least 90° or more in a plane that is parallel with respect to the housing surface of the second housing 102 and with the point of contact with the rotation mechanism portion 105, which is provided at substantially the center position of the display portion 106 provided thereon, as the rotation axis is possible. Further, the passive element 108 is an element that is placed at the upper end portion of the third housing 103 in the longer direction and that is built in and placed so as to extend in the shorter direction as shown in FIG. 1.

As shown in FIG. 1, for the user viewing visual data by holding the present mobile phone in his hand, there are two types of display modes: a display mode for viewing visual data with the display portion 106 left to display in a vertically long manner; and a display mode for viewing visual data by rotating the third housing 103 including the display portion 106 by 90° and placing the display portion 106 in a state in which it is made to display in a horizontally long manner. Since the majority of visual data is suited for horizontally long display, in viewing visual data, the majority of users will view visual data in the latter horizontally long display by rotating the third housing 103 including the display portion 106 by 90°.

In so doing, as the display portion is rotated by just 90°, the passive element 108 built into and placed in the third housing 103 is placed in close proximity to the helical antenna element 107. Due to this proximity, the helical antenna element 107 and the passive element 108 are electro-magnetically coupled with each other, the passive element 108 is excited and operates as an antenna, and as a result, the antenna volume increases as compared to the helical antenna element 107 taken alone. Thus, the antenna characteristics of the helical antenna element 107 improve. In addition, even if the second housing 102 itself were to be made metallic in order to secure rigidity for such purposes as making it thinner, the antenna characteristics of the helical antenna element 107 similarly improve by rotating the third housing 103 including the display portion 106 by 90°.

Thus, according to the present embodiment, by merely rotating the third housing including the display portion 106 by 90° to make the screen display in a horizontally long manner when the user views visual data, antenna characteristics improve. In addition, through this improvement in antenna characteristics, reception quality also improves, the error rate of the reception data can be lowered, and resending of the reception data becomes less frequent. As a result, it becomes possible to receive a correspondingly greater amount of visual data per unit of time, and users are thus able to enjoy images of better quality.

In addition, besides a state in which the first housing 101 is held (visual data viewing 1) as shown in FIG. 2(A), there is also a mode of use for viewing visual data by placing a mobile phone according to the present embodiment on a desk or the like and making the display portion 106 display in a horizontally long manner. In this case, as shown in FIG. 2, in order to make the display portion easier to view, it is often used with the angle between the first housing 101 and the second housing 102 at about 120° (FIG. 2(B): visual data viewing 2). In this case, too, the helical antenna element 107 and the passive element 108 are in close proximity, and they electro-magnetically couple with each other (the electro-magnetic coupling becomes stronger), and the antenna characteristics of the helical antenna element 107 thus improve. In addition, when the mobile phone is placed horizontally as shown in FIG. 2(B), although the polarization of the helical antenna element 107 itself is substantially horizontal polarization, by virtue of the electro-magnetic coupling with the passive element 108 mentioned above, the helical antenna element 107 becomes capable of transmitting/receiving vertically polarized components as well.

Next, with respect to the first embodiment of the present invention, there is shown in FIG. 3 an external view of a mobile phone in a case where the placement of the passive element 108 is changed in such a manner that it extends in the shorter direction at the lower end portion of the third housing 103 in the longer direction. As shown in FIG. 3, by rotating the third housing 103 including the display portion 106 by 90°, the passive element 108 built into and placed in the third housing 103 is placed in close proximity to the helical antenna element 107. Thus, the helical antenna element 107 and the passive element 108 are electro-magnetically coupled with each other, and the antenna characteristics of the helical antenna element 107 improve. Further, since the passive element 108 is in close proximity to the helical antenna element 107 even when the display portion 106 is displaying in a vertically long manner, the helical antenna element 107 and the passive element 108 electro-magnetically couple with each other, and the antenna characteristics of the helical antenna element 107 improve.

Here, even if the second housing 102 itself were made metallic for such purposes as making it thinner, by rotating the third housing 103 including the display portion 106 by 90°, the antenna characteristics of the helical antenna element 107 similarly improve. However, when the display portion 106 is displaying in a vertically long manner, because the passive element 108 and the metallic portion of the second housing 102 are electro-magnetically coupled with each other, the passive element 108 is not excited, and the antenna characteristics of the helical antenna element 107 do not improve.

Therefore, with respect to the placement of the passive element such as that shown in FIG. 3(B), too, as in the first embodiment of the present invention, antenna characteristics improve by just rotating the third housing including the display portion 106 by 90° and making the screen display in a horizontally long manner when the user views visual data. Further, an improvement in antenna characteristics may be expected even when the display portion 106 is displaying in a vertically long manner. Even if the second housing itself were made metallic for such purposes as making it thinner, the antenna characteristics of the helical antenna element 107 improve by rotating the third housing including the display portion 106 by 90°. However, when the display portion 106 is displaying in a vertically long manner, because the passive element 108 is not excited, antenna characteristics do not improve.

Second Embodiment

Figure 4:
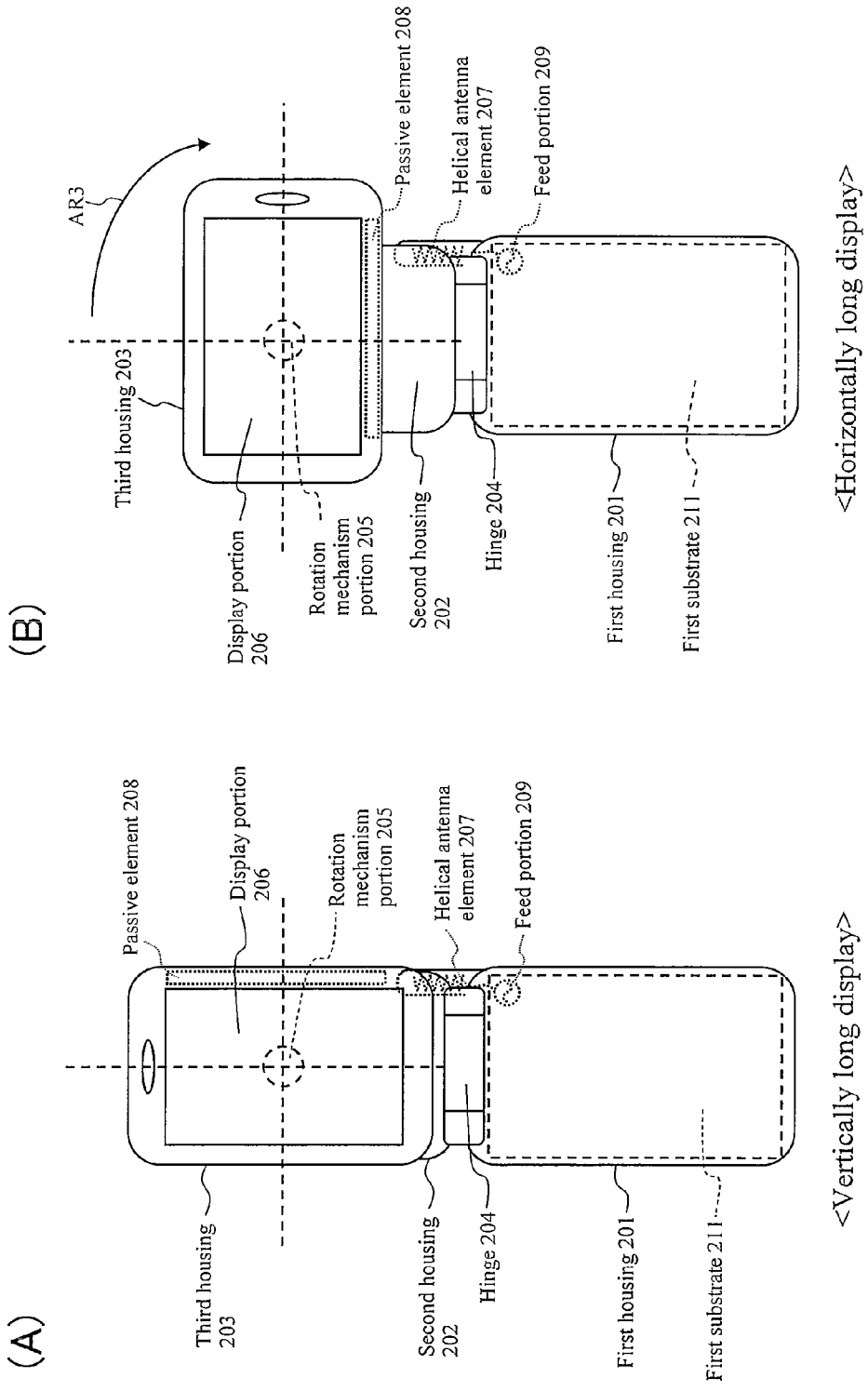
FIG. 4 is a diagram showing a configuration example of a mobile wireless device according to the second embodiment of the present invention.
Figure 5:
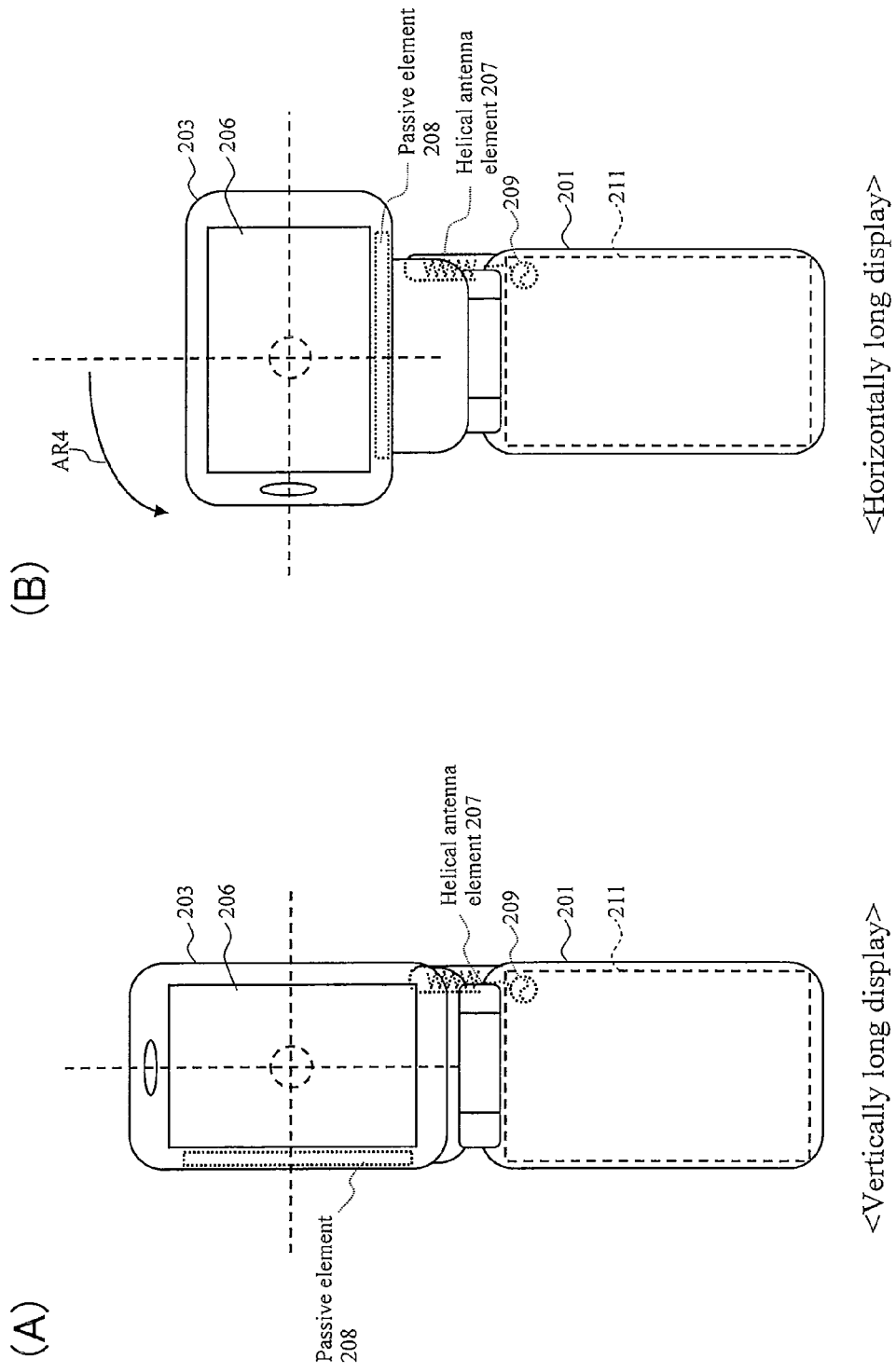
FIG. 5 is a diagram showing a configuration example of a mobile wireless device according to the second embodiment of the present invention.

FIG. 4 and FIG. 5 are diagrams showing external configuration examples of a mobile phone according to the second embodiment of the present invention. A mobile phone according to the second embodiment of the present invention differs only in terms of the placement of the passive element in the first embodiment. The placement of the passive element is such that it is built into and placed in the right end portion of the third housing in the shorter direction so as to extend in the longer direction as shown in FIG. 4.

As shown in FIG. 4(A) to FIG. 4(B), when a third housing 203 is rotated by 90° (AR3) so that a display portion 206 displays in a horizontally long manner, a helical antenna element 207 and a passive element 208 are placed in close proximity to each other. Due to this proximity, the helical antenna element 207 and the passive element 208 are electro-magnetically coupled with each other, and the antenna characteristics of the helical antenna element 207 improve as in the first embodiment of the present invention. Thus, even when the placement of the passive element is changed to the right end portion of the third housing 203 in the shorter direction, effects similar to those in the first embodiment of the present invention are achieved. In addition, although the polarization of the helical antenna element 207 itself is substantially vertical polarization, by virtue of the electro-magnetic coupling with the passive element 208 mentioned above, the helical antenna element 207 becomes capable of transmitting/receiving horizontally polarized components as well.

Next, with respect to the second embodiment of the present invention, there is shown in FIG. 5 an external configuration example of a mobile phone in a case where the placement of the passive element 208 is changed to the left end portion of the third housing 203 in the shorter direction. In this case, too, as shown in FIG. 5, by rotating the third housing 203 including the display portion 206 by 90°, the passive element 208 built into and placed in the third housing 203 is placed in close proximity to the helical antenna element 207, and the helical antenna element 207 and the passive element 208 are thus electro-magnetically coupled with each other. Therefore, as in the second embodiment of the present invention, antenna characteristics improve by just rotating the third housing 203 including the display portion 206 by 90° and making the screen display in a horizontally long manner when the user views visual data. In addition, as discussed above, the helical antenna element 207 becomes capable of transmitting/receiving horizontally polarized components as well.

Third Embodiment

Figure 7:
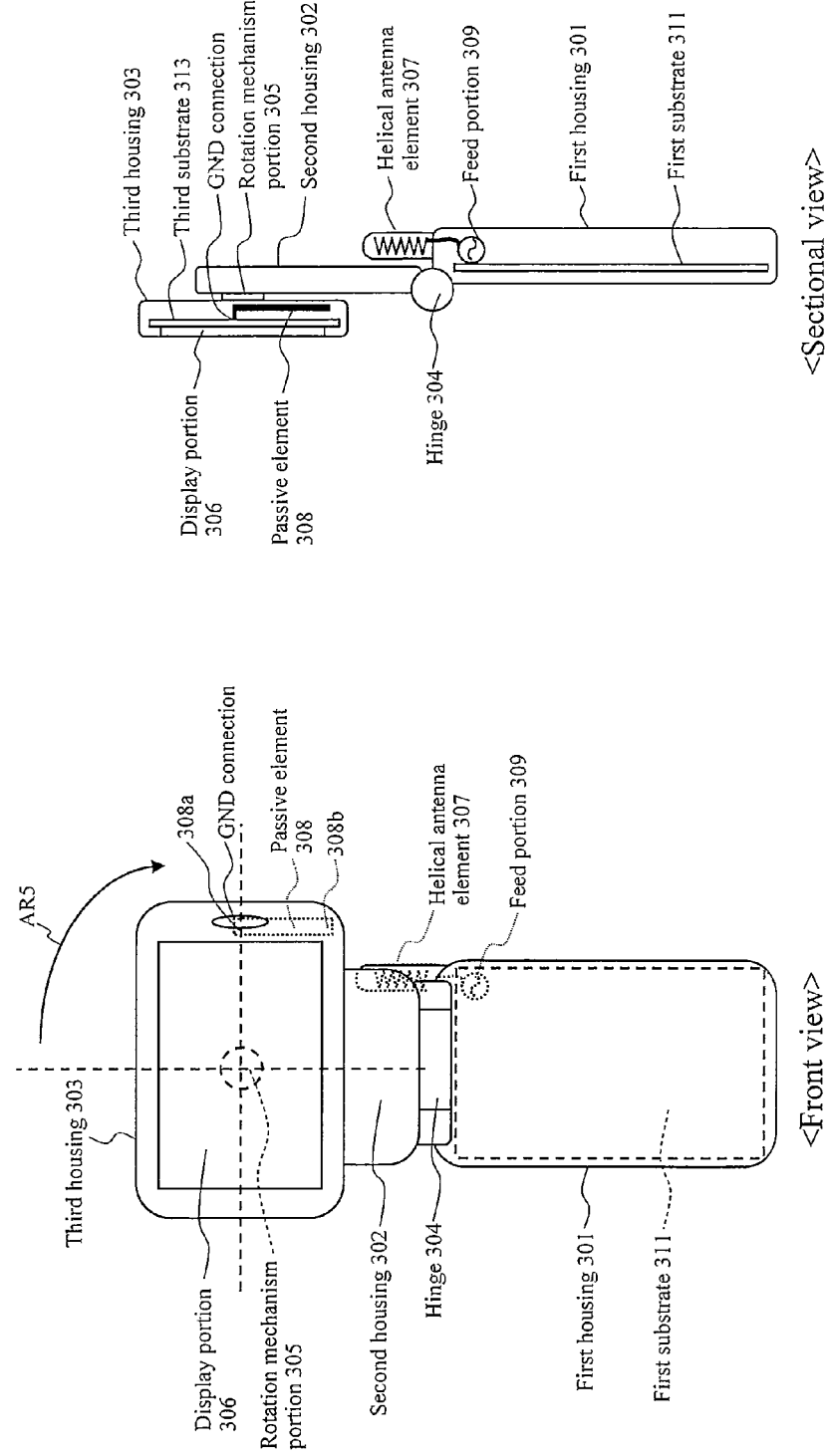
FIG. 7 is a diagram showing a configuration example of a mobile wireless device according to the third embodiment of the present invention.

FIG. 6 and FIG. 7 are diagrams showing external configuration examples of a mobile phone according to the third embodiment of the present invention. Here, the third embodiment of the present invention is a variation on the first embodiment of the present invention, and differs from the first embodiment of the present invention in terms of the shape of the passive element. FIG. 6 is a diagram showing a front view (A) and a sectional view (B) in a case where a display portion 306 of the mobile phone is displaying in a vertically long manner. FIG. 7 is a diagram showing a front view (A) and a sectional view (B) in a case where the display portion 306 of the mobile phone is displaying a horizontally long manner.

In FIG. 6(A), a passive element 308 has one end portion 308a thereof grounded to a GND portion on a third substrate 313 placed within a third housing 303, and the other end portion 308b of the passive element 308 is open. Its electrical length is approximately a quarter of the wavelength with respect to a frequency used by a helical antenna element 307. With respect to FIG. 6, when the third housing 303 is rotated by 90° so that the display portion 306 displays in a horizontally long manner, the helical antenna element 307 and the passive element 308 are placed in close proximity to each other. Due to this proximity, the helical antenna element 307 and the passive element 308 are electro-magnetically coupled with each other, and the antenna characteristics of the helical antenna element 307 similarly improve as in the mobile phone according to the first embodiment of the present invention. Thus, even when the shape of the passive element is changed as shown in the third embodiment of the present invention, effects similar to those in the first embodiment of the present invention are achieved.

In addition, although the passive element 308 of a mobile phone according to the third embodiment of the present invention is one in which the end portion 308a of the passive element 308 is grounded to the GND portion of the third substrate 313 and in which the other end portion 308b of the element is open, the passive element 308 may conversely be a device in which the end portion 308b of the passive element 308 is grounded to the GND portion of the third substrate 313 and in which the other end portion 308a of the element is open.

Fourth Embodiment

FIG. 8 is a diagram showing an external configuration example of a mobile phone according to the fourth embodiment of the present invention. The fourth embodiment of the present invention is a variation on the first embodiment of the present invention, and differs from the first embodiment of the present invention in terms of the shape of the passive element.

With respect to FIG. 8, the shape of a passive element 408 is a meander element with both ends open, and the electrical length thereof is approximately one half of the wavelength with respect to a frequency used by a helical antenna element 407. 409 is a feed portion, 401 a first housing, and 411 a first substrate, where it can be changed from vertically long display to horizontally long display as indicated by AR6.

With respect to FIG. 8, when a third housing 403 is rotated by 90° so that a display portion 406 displays in a horizontally long manner, the helical antenna element 407 and the passive element 408 are placed in close proximity to each other. Due to this proximity, the helical antenna element 407 and the passive element 408 are electro-magnetically coupled with each other, and the antenna characteristics of the helical antenna element 407 improve as in the first embodiment of the present invention. Further, there is also the advantage that by making the passive element 408 be a meander element, more space may be saved.

Naturally, even if the passive element is made to be a meander element in any of the first to third embodiments of the present invention, it is possible to achieve effects similar to those in the mobile phone according to the fourth embodiment of the present invention by adjusting the electrical length of the passive element as deemed appropriate.

Fifth Embodiment

FIG. 9 is a diagram showing an external configuration example of a mobile phone according to the fifth embodiment of the present invention. The fifth embodiment of the present invention is a variation on the first embodiment of the present invention, where the helical antenna element of the mobile phone in the first embodiment of the present invention is changed to a built-in antenna element placed in the first housing near the hinge.

With respect to FIG. 9, when a third housing 503 is rotated by 90° (AR7) so that a display portion 506 displays in a horizontally long manner, a built-in antenna element 507 and a passive element 508 are placed in close proximity to each other. Due to this proximity, the built-in antenna element 507 and the passive element 508 are electro-magnetically coupled with each other, and the antenna characteristics of the built-in antenna element 507 improve as in the first embodiment of the present invention. Thus, it is applicable not only to the helical antenna element used in the first embodiment of the present invention, but also to a built-in antenna element as an antenna for receiving such visual data as videos, TV, and the like. In addition, a built-in antenna element is advantageous in that the housing of the mobile phone becomes more compact as compared to an external helical antenna element.

Sixth Embodiment

Figure 10:
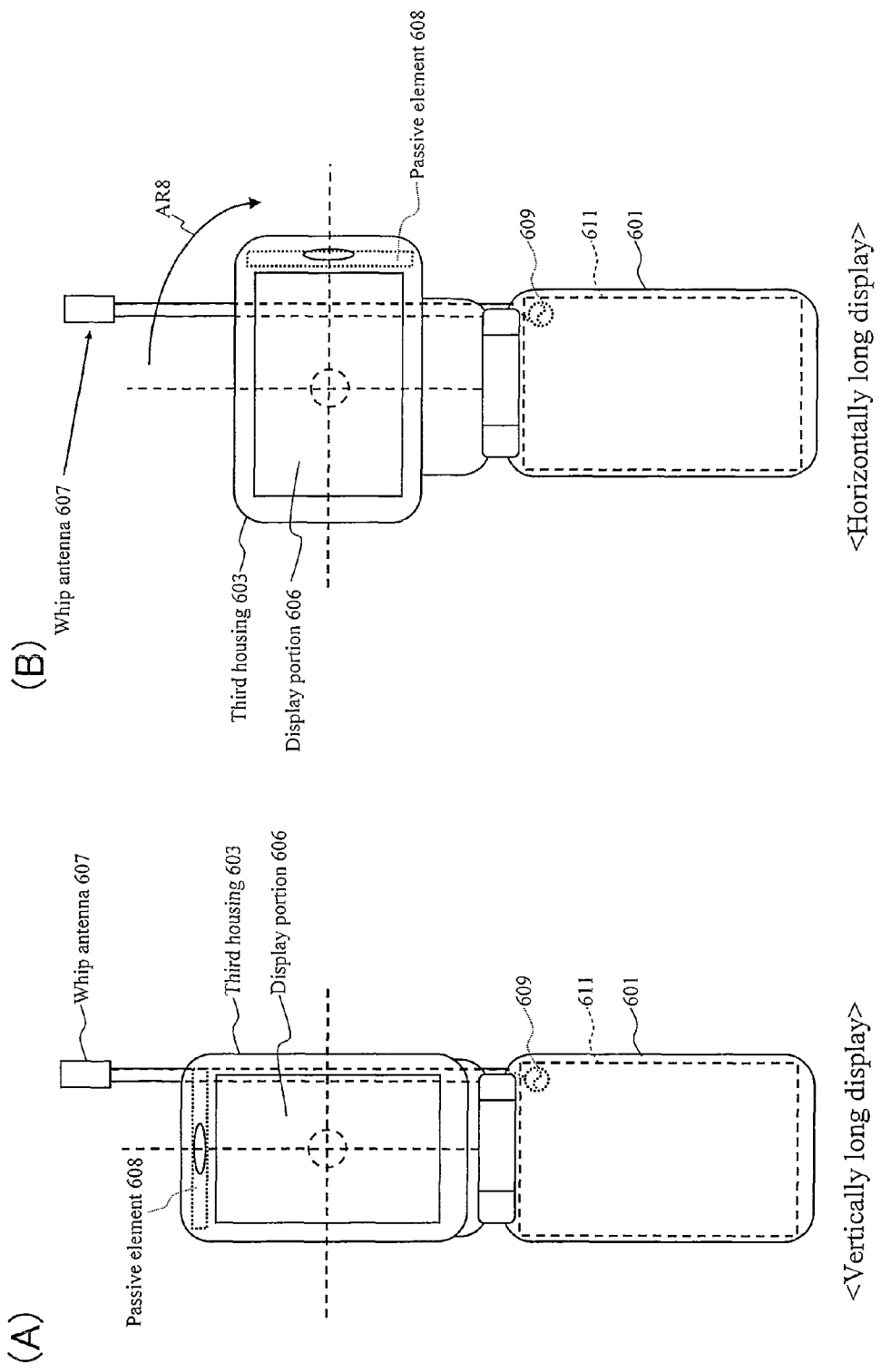
FIG. 10 is a diagram showing a configuration example of a mobile wireless device according to the sixth embodiment of the present invention.

FIG. 10 is a diagram showing an external configuration example of a mobile phone according to the sixth embodiment of the present invention. The sixth embodiment of the present invention is a variation on the first embodiment of the present invention, where the helical antenna element in the first embodiment of the present invention is changed to a whip antenna placed at the first housing near the hinge.

With respect to FIG. 10, the arrangement is such that when a third housing 603 is rotated by just 90° (AR8) so that a display portion 606 displays in a horizontally long manner, a whip antenna 607 and a passive element 608 are placed in close proximity to each other. Due to this proximity, the whip antenna 607 and the passive element 608 are electro-magnetically coupled with each other, and the antenna characteristics of the whip antenna 607 improve as in the first embodiment of the present invention. Thus, the present invention is applicable not only to the helical antenna element used in the first embodiment of the present invention, but also to a whip antenna as an antenna for receiving such visual data as videos, TV, and the like. In addition, since the whip antenna 607 generally has better antenna characteristics than a helical antenna element, antenna characteristics further improve by a corresponding amount.

Seventh Embodiment

Figure 11:
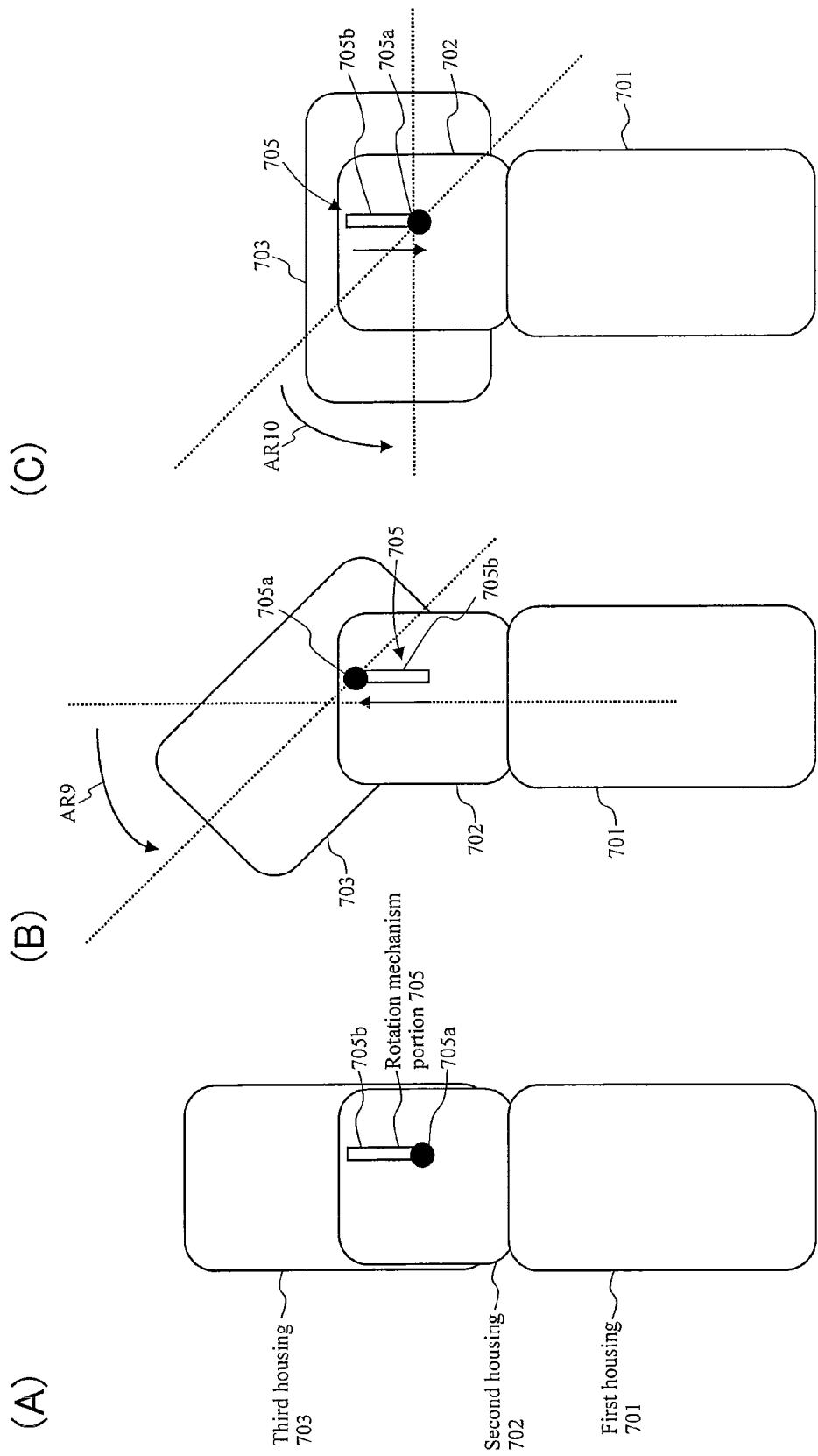
FIG. 11 is a diagram showing a configuration example of a mobile wireless device according to the seventh embodiment of the present invention.
Figure 13:
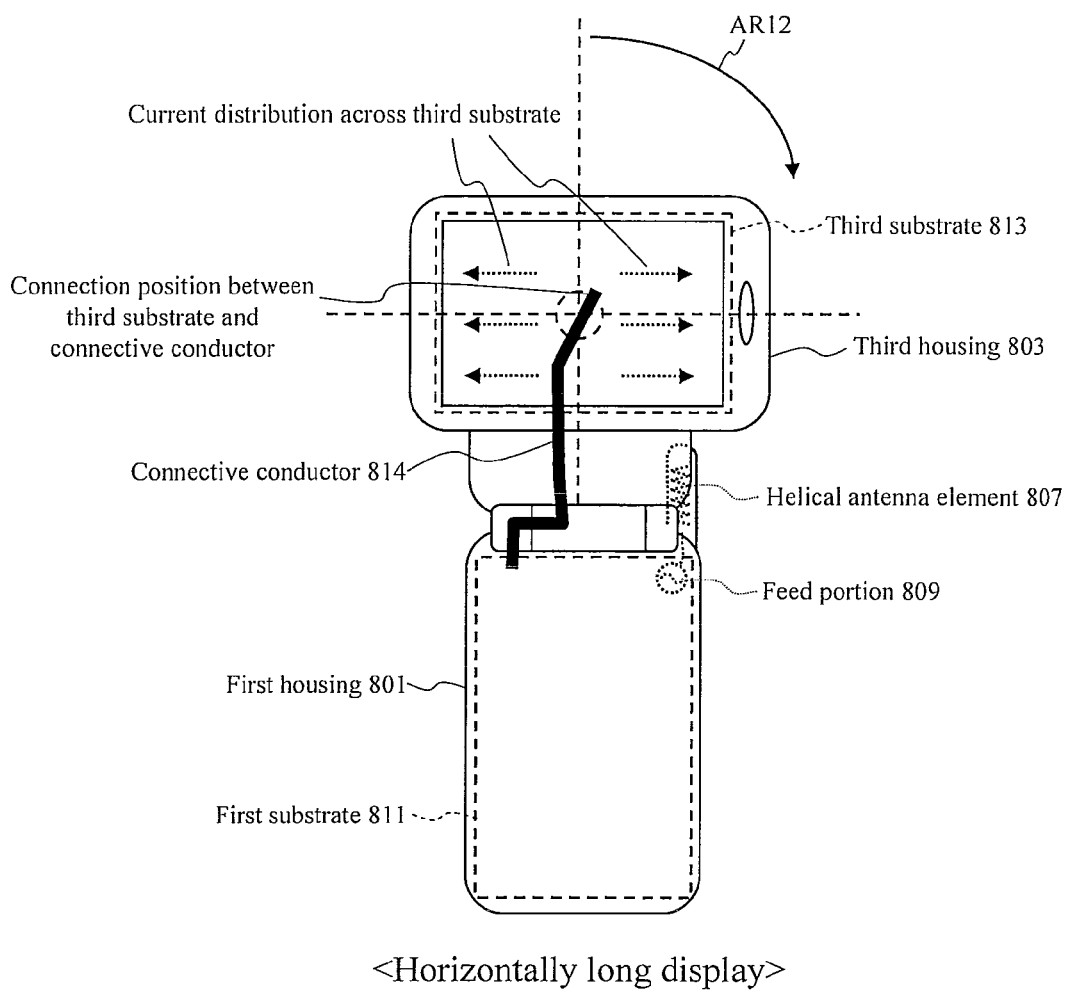
FIG. 13 is a diagram showing a configuration example of a mobile wireless device of the present invention.
Figure 14:
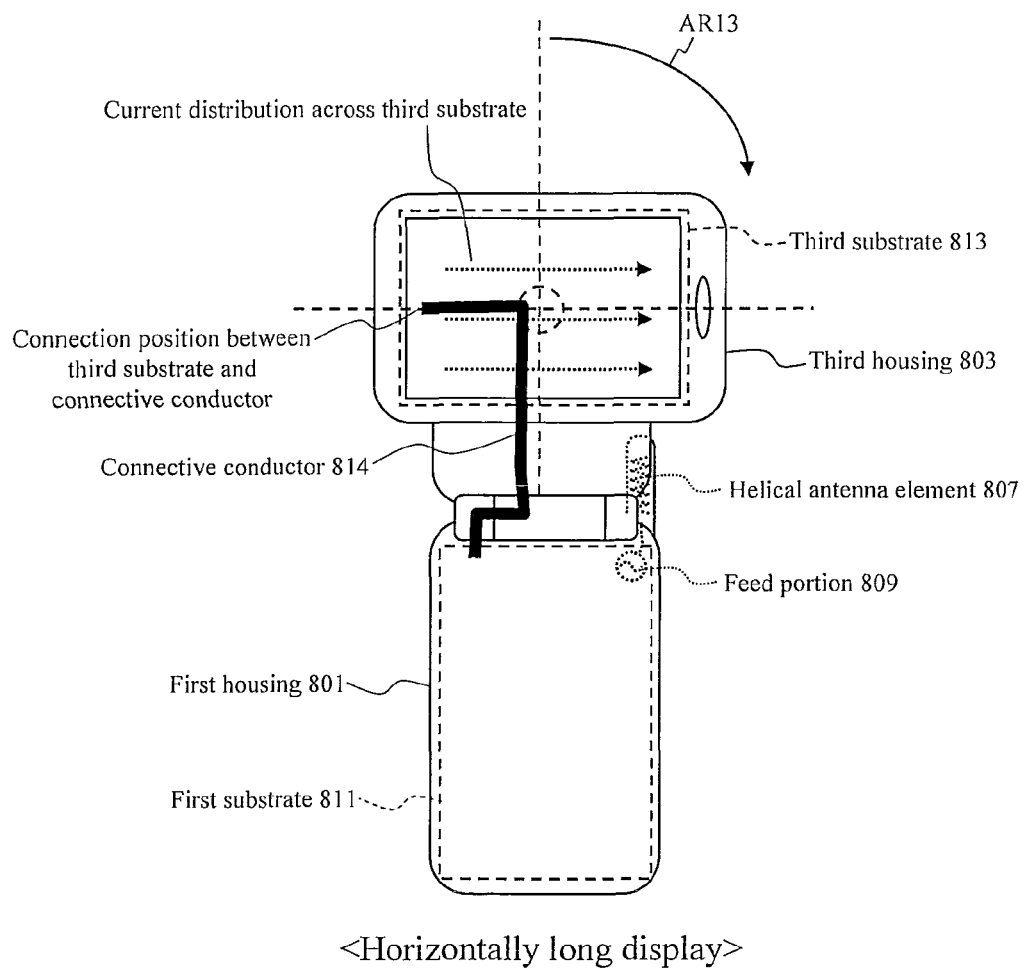
FIG. 14 is a diagram showing a configuration example of a mobile wireless device of the present invention.

FIG. 11 and FIG. 12 are diagrams showing an external configuration example of a mobile phone according to the seventh embodiment of the present invention. The mobile phone according to the seventh embodiment of the present invention is a variation on the first embodiment of the present invention, and is characterized in that it comprises a structure in which the rotation axis of the rotation mechanism portion in the first embodiment of the present invention varies. FIGS. 11(A) through (C) are diagrams of the mobile phone as viewed from behind, and show how a third housing 703 rotates by 90° while a rotation mechanism portion 705 varies the rotation axis. In this configuration example, the rotation axis moves in the up/down direction (vertical direction) with rotation AR9 and AR10a as a results of a pivot point 705a of the rotation axis moving along an elongate rail 70b extending in the vertical direction. FIGS. 12(A) and (B) are diagrams showing a configuration example of the mobile phone in a case where a display portion 706 is displaying in a vertically long manner (A), and a case where the third housing 703 including the display portion 706 is rotated by 90° so as to display in a horizontally long manner (B).

With respect to the seventh embodiment of the present invention, in rotating the third housing 703 by 90°, the rotation axis of the rotation mechanism portion 705 is moved up to rotate the third housing 703 as shown in FIG. 11. Then, once the third housing 703 has been rotated by 90° and the third housing 703 has become horizontally long, the rotation axis of the rotation mechanism portion 705 moves down to return to the original position. Due to this rotation, the relative positional relationship between a first housing 701 and the third housing 703 is such that it is in closer proximity than in the relative positional relationship between the first housing 101 and the third housing 103 in the first embodiment of the present invention shown in FIG. 1.

Consequently, in a case where the display portion 706 is displaying in a horizontally long manner, the inter-antenna distance between a helical antenna element 707 and a passive element 708 is closer in proximity in the seventh embodiment of the present invention than it is in the first embodiment of the present invention. The electro-magnetic coupling between the antennas thus becomes stronger. Due to this proximity, the helical antenna element 707 and the passive element 708 become electro-magnetically coupled with each other, and the antenna characteristics of the helical antenna element 707 improve as in the first embodiment of the present invention.

Therefore, because the antenna coupling between the helical antenna element and the passive element becomes stronger than in the first embodiment of the present invention, freedom of placement improves for the passive element. Further, there is also the advantage that the mobile phone becomes more compact than in the first embodiment of the present invention.

As described above, with a mobile phone according to the present embodiment, with respect to a wireless communication device in which a first housing and a second housing are foldably connected via a hinge, and in which a third housing comprising a substantially rectangular display portion is connected to the second housing with a rotation mechanism portion that rotates in a plane that is parallel with respect to a surface of the second housing, by having a passive element placed at the third housing with respect to an antenna placed at the first housing near the hinge, there is the advantage that good antenna characteristics can be achieved through an operation of merely rotating the display portion so that it displays in a horizontally long manner.

The switch between the first display mode and the second display mode and the switch between the reception of visual data and communication/calls may be coordinated. For example, it may be configured such that control is performed by a program or the like whereby when there is a switch from the second display mode to the first display mode, that switch is detected mechanically, and the reception of visual data automatically goes into standby.

INDUSTRIAL APPLICABILITY

The present invention is applicable to mobile phones, PDAs, and other mobile terminals.

The invention claimed is:
1. A wireless receiver device comprising:
a first housing;
a second housing connected to the first housing;
a third housing having a substantially rectangular display portion;
a rotation mechanism portion rotatably connecting the third housing and the second housing in a plane parallel to a display surface of the display portion;
a first display mode in which, through a rotation by the rotation mechanism portion, the display portion displays in a horizontally long manner when the first housing is held;
a second display mode in which the display portion displays in a vertically long manner;
an antenna element placed at the first housing; and
a passive element placed at the third housing which is placed closer to the antenna element by rotating the third housing with respect to the second housing using the rotation mechanism portion to the first display mode, where electro-magnetic coupling with the antenna element becomes stronger.

2. The wireless receiver device according to claim 1, wherein
the wireless receiver device is capable of assuming, through a rotation by the rotation mechanism portion, a first display mode in which the display portion displays in a horizontally long manner when the first housing is held, and a second display mode in which the display portion displays in a vertically long manner, and
by changing from the second mode to the first mode, the passive element is placed in close proximity to the antenna element.

3. The wireless receiver device according to claim 2, wherein an image received with the antenna element is displayed on the display portion in the first display mode.

4. The wireless receiver device according to claim 1, wherein the antenna element receives a TV image.

5. A wireless communication device comprising:
a first housing,
a second housing that is foldably connected to the first housing via a hinge portion,
a third housing having a substantially rectangular display portion,
a rotation mechanism portion that rotatably connects the third housing and the second housing in a plane that is parallel to a display surface of the display portion,
a first display mode in which, through a rotation by the rotation mechanism portion, the display portion displays in a horizontally long manner when the first housing is held;
a second display mode in which the display portion displays in a vertically long manner;
an antenna element provided at the first housing near the hinge portion; and
a passive element placed at the third housing is placed at a position closer to the antenna element where electro-magnetic coupling with the antenna element becomes stronger by rotating the third housing to the first display mode using the rotation mechanism portion.

6. The wireless communication device according to claim 5, wherein the third housing has a substantially rectangular shape, and includes an end portion on a longer side of the third housing, and wherein the passive element is placed at the end portion of the third housing on the longer side, the longer side being located opposite another longer side in the shorter direction.

7. The wireless communication device according to claim 5, wherein the third housing has a substantially rectangular shape, and includes an end portion on a shorter side of the third housing, wherein the passive element is placed at the end portion of the third housing on the shorter side, the shorter side being located opposite another shorter side in the longer direction.

8. The wireless communication device according to claim 5, wherein the passive element is an element with both ends open, and is an element that is so adjusted that the electrical length of the passive element is approximately one half of a wavelength with respect to a frequency used by the antenna element.

9. The wireless communication device according to claim 5, wherein the passive element is an element in which one of its end portions is conductively connected with a ground portion of the third housing and the other end portion of the passive element is open, and is one that is so adjusted that the electrical length of the passive element is approximately a quarter of a wavelength with respect to a frequency used by the antenna element.

10. The wireless communication device according to claim 5, wherein the passive element is a meander element.

11. The wireless communication device according to claim 5, wherein the antenna element is an antenna element that is built into and placed in the first housing near the hinge.

12. The wireless communication device according to claim 5, wherein the antenna element is a helical antenna element that is externally placed on the first housing near the hinge.

13. The wireless communication device according to claim 5, wherein the antenna element is a whip antenna that allows for extension and storage of the antenna.

14. The wireless communication device according to claim 5, wherein the rotation mechanism portion comprises a rotation axis varying mechanism that varies a rotation axis of the second housing.

15. The wireless communication device according to claim 14, wherein the rotation axis varying mechanism is characterized in that the rotation axis so varies that the electromagnetic coupling between the passive element and the antenna element becomes stronger when there is a change from the second display mode to the first display mode.

16. The wireless communication device according to claim 15, wherein the rotation axis varying mechanism is characterized in that the rotation axis moves in the up/down direction due to a pivot point of the rotation axis moving, in accordance with the rotation, along a rail extending in the vertical direction.

17. The wireless communication device according to claim 2, wherein visual data becomes receivable in the first display mode.

18. The wireless communication device according to claim 2, wherein communication or a call is possible in the second display mode.

19. The wireless communication device according to claim 2, further comprising a coordinating mechanism that coordinates a switch between the first display mode and the second display mode and a switch between reception of the visual data and the communication or call.

20. The wireless communication device according to claim 5, wherein visual data becomes receivable in the first display mode.

21. The wireless communication device according to claim 5, wherein communication or a call is possible in the second display mode.

22. The wireless communication device according to claim 5, further comprising a coordinating mechanism that coordinates a switch between the first display and the second display mode and a switch between reception of the visual data and the communication or call.

* * * * *